Patented Dec. 31, 1940

2,227,305

UNITED STATES PATENT OFFICE 2,227,305

METHOD OF COATING SURFACES WITH FLUORESCENT POWDER

Harold Grossman, Montclair, N. J.

No Drawing. Application March 21, 1940,
Serial No. 325,181

10 Claims. (Cl. 250—81)

This invention relates to the coating of surfaces with fluorescent powders, and particularly to the application of such powders to glass tubes which are rendered luminescent by electrical discharge, especially in the presence of rare gases such as neon, argon, krypton and xenon, or mixtures thereof.

In the production of luminescent tubes, it is a common practice to employ fluorescent materials applied to the surface of the tubes. Such fluorescent material modifies the light emanating from the tube, resulting in greater light efficiency and the production of less heat.

Various media have been utilized heretofore as vehicles for the fluorescent material, so that it could be readily applied to the tube surface. Aqueous solutions of alkali silicates, for example potassium silicate, may be thus employed, but the use of potassium silicate introduces the potassium spectral band in the light emitted from the tube, which is often undesirable. Furthermore, the film of silicate has a tendency to crystallize and to disintegrate in use, so that the fluorescent material fails to adhere to the surface when the tube is in use.

Another bonding agent heretofore used is a dilute solution of nitrated cellulose. After the fluorescent material suspended in such a solution is spread over the surface, it is dried by evaporation of the solvent or solvents. It is then necessary to break down the nitrated cellulose to carbon and to oxidize the carbon, in order that the surface may be free from organic materials.

Both of the methods above described are costly and require a substantial time, often several days, to complete the coating, particularly where it is necessary to bake the tubes in order to remove all organic matter.

It is the object of the present invention to provide a simple and satisfactory method of coating the surfaces of tubes and other objects with fluorescent materials, and a coating material for that purpose, which may be dried in a few minutes by subjecting it simply to a stream of air or merely by permitting it to remain on the surface exposed to the atmosphere.

I have discovered that certain inorganic compounds, when dispersed in non-aqueous volatilizable liquids, do not ionize, and that when such liquids are evaporated the residue is not crystalline but remains as an adhesive film. I prefer to employ monoaluminum phosphate for the purpose of the invention, but other inorganic compounds, for example ammonium hexaphosphate dinitride may be employed. Inorganic compounds of the type described may be dispersed in suitable non-aqueous liquids having relatively low boiling points such as alcohols and ketones. Acetone is an excellent material for the purpose, and other low boiling ketones may be used. Methanol, ethanol and other low boiling alcohols are likewise useful.

In carrying out the invention, I select a suitable inorganic salt, for example monoaluminum phosphate, and disperse it in a vehicle such as acetone. The proportions are not critical, and the following example will indicate a desirable composition for the purpose:

| | |
|---|---|
| Fluorescent powder | 10 |
| Monoaluminum phosphate | 1 |
| Denatured alcohol or acetone | 50 |

When the monoaluminum phosphate has been dispersed in the vehicle, I add thereto the desired amount of finely powdered fluorescent material such as zinc silicate, zinc beryllium silicate, calcium tungstate, etc. The amount of fluorescent material may be varied, depending upon the thickness of the film desired. In general, it is desirable to employ about 10 grams of the fluorescent material with 30 grams of the vehicle. The mixture is ground for 2 hours more or less in a pebble mill or other suitable mixing device, until the ingredients are thoroughly incorporated.

The mixture thus prepared may be applied to the surface to be coated in any suitable manner as by dipping, flowing the solution over the surface, brushing or spraying. As soon as the mixture has been applied to the surface, it may be dried promptly. To facilitate drying, a stream of air may be blown across the surface, although the drying can be effected readily by simply leaving the surface exposed to the atmosphere. The drying time is only a few minutes, and the prepared surface is then ready for use.

The coating produced as described is not affected by use, the bond is substantially permanent, and there is no possibility of injuring the fluorescent material as the result of the application of high temperatures thereto. The time consumed in coating is materially reduced, and the tubes or other coated surfaces are, therefore, less expensive to prepare and use.

Various changes may be made in the details of the composition and the procedure, without departing from the invention or sacrificing any of the advantages thereof.

I claim:

1. The method of coating surfaces of luminescent tubes with fluorescent materials which comprises suspending the fluorescent material in a vehicle consisting of a low boiling liquid organic compound with an inorganic salt from the class consisting of monoaluminum phosphate and ammonium hexa phosphate dinitride dispersed therein, applying the suspension to the surface, and permitting the coating to dry.

2. The method of coating surfaces of luminescent tubes with fluorescent materials which comprises suspending the fluorescent material in a vehicle consisting of a low boiling liquid organic compound having monoaluminum phosphate dispersed therein, applying the suspension to the surface and permitting the coating to dry.

3. The method of coating surfaces of luminescent tubes with fluorescent materials which comprises suspending the fluorescent material in a vehicle consisting of a low boiling liquid organic compound with ammonium hexaphosphate dinitride dispersed therein, applying the suspension to the surface and permitting the coating to dry.

4. A coating composition comprising a fluorescent material suspended in a vehicle including as an essential ingredient an inorganic salt from the class consisting of monoaluminum phosphate and ammonium hexaphosphate dinitride dispersed in a low boiling liquid organic compound.

5. A coating composition comprising a fluorescent material suspended in a vehicle including as an essential ingredient monoaluminum phosphate dispersed in a low boiling liquid organic compound.

6. A coating composition comprising a fluorescent material suspended in a vehicle consisting of monoaluminum phosphate dispersed in acetone.

7. A coating composition comprising a fluorescent material suspended in a vehicle consisting of monoaluminum phosphate dispersed in an alcohol.

8. A coating composition comprising a fluorescent material suspended in a vehicle consisting of a low boiling liquid organic compound and an inorganic salt from the class consisting of monoaluminum phosphate and ammonium hexaphosphate dinitride, said salt being insoluble in the organic compound but dispersable therein and adapted when dried to afford an adherent film.

9. A coating composition comprising a fluorescent material suspended in a vehicle consisting of a low boiling liquid organic compound having ammonium hexaphosphate dinitride dispersed therein.

10. A coating composition comprising a fluorescent material suspended in a vehicle consisting of monoaluminum phosphate dispersed in a ketone.

HAROLD GROSSMAN.